United States Patent
Sedlar

(10) Patent No.: US 6,427,123 B1
(45) Date of Patent: Jul. 30, 2002

(54) HIERARCHICAL INDEXING FOR ACCESSING HIERARCHICALLY ORGANIZED INFORMATION IN A RELATIONAL SYSTEM

(75) Inventor: Eric Sedlar, Palo Alto, CA (US)

(73) Assignee: Oracle Corporation, Redwood Shores, CA (US)

( * ) Notice: Subject to any disclaimer, the term of this patent is extended or adjusted under 35 U.S.C. 154(b) by 0 days.

(21) Appl. No.: 09/251,757

(22) Filed: Feb. 18, 1999

(51) Int. Cl.$^7$ .............................. G06F 17/30; G06F 7/00
(52) U.S. Cl. ........................................................ 702/2
(58) Field of Search ................................ 707/100–104, 707/1–10, 3, 4

(56) References Cited

U.S. PATENT DOCUMENTS

| | | | | |
|---|---|---|---|---|
| 5,210,686 A | * | 5/1993 | Jernigan ...................... 364/403 |
| 5,369,763 A | * | 11/1994 | Biles .......................... 395/600 |
| 5,454,101 A | * | 9/1995 | Mackay et al. ................. 707/3 |
| 5,467,471 A | * | 11/1995 | Bader ............................. 707/1 |
| 5,524,240 A | * | 6/1996 | Barbara et al. ............. 395/600 |
| 5,530,849 A | * | 6/1996 | Hanushevsky et al. ..... 395/600 |
| 5,544,360 A | * | 8/1996 | Lewak et al. .................. 707/1 |
| 5,546,571 A | * | 8/1996 | Shan et al. ................. 395/600 |
| 5,838,965 A | * | 11/1998 | Kavanagh et al. .......... 707/103 |
| 5,842,212 A | * | 11/1998 | Ballurio et al. ............. 707/100 |
| 5,921,582 A | * | 7/1999 | Gusack ......................... 283/36 |
| 5,974,407 A | * | 10/1999 | Sacks ............................. 707/2 |
| 6,112,209 A | * | 8/2000 | Gusack ........................... 707/1 |
| 6,182,121 B1 | * | 1/2001 | Wlaschin .................... 709/215 |
| 6,192,273 B1 | * | 2/2001 | Igel et al. .................... 600/518 |
| 6,192,373 B1 | * | 2/2001 | Haegele ...................... 707/104 |
| 6,208,993 B1 | * | 3/2001 | Shadmon .................... 707/102 |
| 6,279,007 B1 | * | 8/2001 | Uppala ........................ 707/100 |

* cited by examiner

*Primary Examiner*—John Breene
*Assistant Examiner*—Linh M Pham
(74) *Attorney, Agent, or Firm*—Hickman Palermo Truong & Becker LLP; Brian D. Hickman; John D. Henkhaus

(57) ABSTRACT

A method and mechanism are provided for creating, maintaining, and using a hierarchical index to efficiently access information in a relational system based on a pathnames, thus emulating a hierarchically organized system. Each item that has any children in the emulated hierarchical system has an index entry in the index. The index entries in the index are linked together in a way that reflects the hierarchical relationship between the items associated with the index entries. Pathname resolution is performed by following direct links between the index entries associated with the items in a pathname, according to the sequence of the filenames within the pathname. By using an index whose index entries are linked in this manner, the process of accessing the items based on their pathnames is significantly accelerated, and the number of disk accesses performed during that process is significantly reduced.

34 Claims, 9 Drawing Sheets

HIERARCHICAL INDEX 510

| Row ID | File ID | Dir Entry list |
|---|---|---|
| 508 — Y1 | X1 | {(Windows, Y2, X2) (Unix, Y4, X6) (VMS, Y5, X9)} |
| 512 — Y2 | X2 | {(Word, Y3, X3) (Access, null, X5)} |
| 514 — Y3 | X3 | {(Example.doc, null, X4)} |
| 516 — Y4 | X6 | {(App1, null, X7) — 518 (App2, null, X8)} |
| Y5 | X9 | {(App3, null, X10) (App4, Y6, X11)} |
| Y6 | X11 | {(Example.doc, null, X12)} |

FILES TABLE 210

| Row ID | File ID | Name | Body | Modification Date... |
|---|---|---|---|---|
| R1 | X1 | / | (NULL) | |
| R2 | X2 | Windows | (NULL) | |
| R3 | X3 | Word | (NULL) | |
| R4 | X4 | Example.doc | BLOB | |
| R5 | X5 | Access | (NULL) | |
| R6 | X6 | Unix | (NULL) | |
| R7 | X7 | App1 | (NULL) | |
| R8 | X8 | App2 | (NULL) | |
| R9 | X9 | VMS | (NULL) | |
| R10 | X10 | App3 | (NULL) | |
| R11 | X11 | App4 | (NULL) | |
| R12 | X12 | Example.doc | BLOB | |

PRIOR ART

Fig. 2

DIRECTORY_LINKS TABLE 310

| Parent ID | Child ID | Child_Name |
|-----------|----------|------------|
| X1 | X2 | Windows |
| X2 | X3 | Word |
| X3 | X4 | Example.doc |
| X2 | X5 | Access |
| X1 | X6 | Unix |
| X6 | X7 | App1 |
| X6 | X8 | App2 |
| X1 | X9 | VMS |
| X9 | X10 | App3 |
| X9 | X11 | App4 |
| X11 | X12 | Example.doc |

PRIOR ART

Fig. 3

HIERARCHICAL INDEX 510

| Row ID | File ID | Dir Entry list |
|---|---|---|
| Y1 | X1 | {(Windows, Y2, X2) (Unix, Y4, X6) (VMS, Y5, X9)} |
| Y2 | X2 | {(Word, Y3, X3) (Access, null, X5)} |
| Y3 | X3 | {(Example.doc, null, X4)} |
| Y4 | X6 | {(App1, null, X7) (App2, null, X8)} |
| Y5 | X9 | {(App3, null, X10) (App4, Y6, X11)} |
| Y6 | X11 | {(Example.doc, null, X12)} |

Fig. 5

HIERARCHICAL INDEXING FOR ACCESSING HIERARCHICALLY ORGANIZED INFORMATION IN A RELATIONAL SYSTEM

FIELD OF THE INVENTION

The present invention relates generally to database systems, and in particular to using a hierarchical index to access hierarchically organized information in a relational database system.

BACKGROUND OF THE INVENTION

Humans tend to organize information in categories. The categories in which information is organized are themselves typically organized relative to each other in some form of hierarchy. For example, an individual animal belongs to a species, the species belongs to a genus, the genus belongs to a family, the family belongs to an order, and the order belongs to a class.

With the advent of computer systems, techniques for storing electronic information have been developed that largely reflected this human desire for hierarchical organization. Conventional computer file systems, for example, are typically implemented using hierarchy-based organization principles. Specifically, a typical file system has directories arranged in a hierarchy, and documents stored in the directories. Ideally, the hierarchical relationships between the directories reflect some intuitive relationship between the meanings that have been assigned to the directories. Similarly, it is ideal for each document to be stored in a directory based on some intuitive relationship between the contents of the document and the meaning assigned to the directory in which the document is stored.

FIG. 1 shows an example of a typical file system. The illustrated file system includes numerous directories arranged in a hierarchy. Two documents 118 and 122 are stored in the directories. Specifically, documents 118 and 122, both of which are entitled "Example.doc", respectively stored in directories 116 and 124, which are respectively entitled "Word" and "App4".

In the directory hierarchy, directory 116 is a child of directory 114 entitled "Windows", and directory 114 is a child of directory 110. Similarly, directory 124 is a child of directory 126 entitled "VMS", and directory 126 is a child of directory 110. Directory 110 is referred to as the "root" directory because it is the directory from which all other directories descend. In many systems, the symbol "/" is used to refer to the root directory.

When electronic information is organized in a hierarchy, each item of information may be located by following a "path" through the hierarchy to the entity that contains the item. Within a hierarchical file system, the path to an item begins at the root directory and proceeds down the hierarchy of directories to eventually arrive at the directory that contains the item of interest. For example, the path to file 118 consists of directories 110, 114 and 116, in that order.

Hierarchical storage systems often allow different items to have the same name. For example, in the file system shown in FIG. 1, both of the documents 118 and 122 are entitled "Example.doc". Consequently, to unambiguously identify a given document, more than just the name of the document is required.

A convenient way to identify and locate a specific item of information stored in a hierarchical storage system is through the use of a "pathname". A pathname is a concise way of uniquely identifying an item based on the path through the hierarchy to the item. A pathname is composed of a sequence of names. In the context of a file system, each name in the sequence of names is a "filename". The term "filename" refers to both the names of directories and the names of documents, since both directories and documents are considered to be "files".

Within a file system, the sequence of filenames in a given pathname begins with the name of the root directory, includes the names of all directories along the path from the root to the item of interest, and terminates in the name of the item of interest. Typically, the list of directories to traverse is concatenated together, with some kind of separator punctuation (e.g., '/', '\', or ';') to make a pathname. Thus, the pathname for document 118 is /Windows/Word/Example.doc, while the pathname for document 122 is /NVMS/App4/Example.doc.

The relationship between directories (files) and their contained content varies significantly between different types of hierarchically organized systems. One model, employed by various implementations, such as Windows and DOS file systems, requires each file to have exactly one parent, forming a tree. In a more complicated model, the hierarchy takes the form of a directed graph, where files can have multiple parents, as in the UNIX file system in which hard links are used.

In contrast to hierarchical approaches to organizing electronic information, a relational database stores information in tables comprised of rows and columns. Each row is identified by a unique RowID. Each column represents an attribute of a record, and each row represents a particular record. Data is retrieved from the database by submitting queries to a database management system (DBMS) that manages the database.

Each type of storage system has advantages and limitations. A hierarchically organized storage system is simple, intuitive, and easy to implement, and is a standard model used by most application programs. Unfortunately, the simplicity of the hierarchical organization does not provide the support required for complex data retrieval operations. For example, the contents of every directory may have to be inspected to retrieve all documents created on a particular day that have a particular filename. Since all directories must be searched, the hierarchical organization does nothing to facilitate the retrieval process.

A relational database system is well suited for storing large amounts of information and for accessing data in a very flexible manner. Relative to hierarchically organized systems, data that matches even complex search criteria may be easily and efficiently from a relational database system. However, the process of formulating and submitting queries to a database server is less intuitive than merely traversing a hierarchy of directories, and is beyond the technical comfort level of many computer users.

In the past, hierarchically organized systems and relationally organized systems have been implemented in different ways that were not compatible. With some additional processing, however, a relationally organized system can emulate a hierarchically organized system. This type of emulation is especially desirable when the storage capability and flexibility of a relational system is needed, but the intuitiveness and ubiquity of the hierarchical system is desired.

Such emulation may be implemented through the use of two relational tables: a "File" table and a "Directory$_{13}$ links" table. The File table stores information relating to each file in the emulated hierarchical system. For files that are documents, the File table further stores either the body of the file (in the form of a large binary object (BLOB)), or a pointer to the body of the document. The Directory$_{13}$ links table stores all of the link information that indicates the parent-child relationships between files.

To illustrate how these two tables may be used to emulate a hierarchical storage system, suppose that a file system having the hierarchical structure of FIG. 1 is implemented in a database. The file system of FIG. 1 can be illustrated as follows (a unique ID, shown in parentheses, is assigned by the system to uniquely identify each file):

/(X1)
   Windows (X2)
      Word (X3)
         Example.doc (X4)
      Access (X5)
   Unix (X6)
      App1 (X7)
      App2 (X8)
   VMS (X9)
      App3 (X10)
      App4 (X11)
         Example.doc (X12)

FIG. 2 shows a files table 210, and FIG. 3 shows a directory links table 310, which may be used by a computer system to emulate the file system of FIG. 1 in a relational database system. Files table 210 contains an entry for each file in the system. Each entry includes a RowID, a file ID, a name, a body column, and a modification date column (plus other system-maintained information such as creation date, access permission information, etc.).

The FileID is a unique ID assigned to each file by the system, the name is the name assigned to the file, which does not need to be unique, and the body is the field in which the contents of a file are stored. The body field may store the actual contents of a file in the form of a binary large object (BLOB), or a pointer to the contents of the file. Where the entry is for a file having no content (e.g. a directory), the body field is null. In the above example, only the two documents entitled Example.doc have content; thus, the body field for all of the other entries is null.

In directory links table 310, an entry is stored for each link. between files in the file system of FIG. 1. Each entry includes a parent ID, a child ID, and a child$_{13}$ name field. For each link, the parent ID field specifies the file which is the parent file for the link, the child ID field specifies the file which is the child file for the link, and the child$_{13}$ name field specifies the name of the child file in the link. Thus, for example, in the entry for the link between root directory 110 and Windows directory 114, directory links table 310 specifies that X1 (the FileID of the root directory) is the Parent ID, X2 (the FileID of the Windows directory) is the child ID, and "Windows" is the child$_{13}$ name.

To illustrate how the information in these two tables may be used to implement the file system of FIG. 1, suppose that it is necessary to access document 118. As explained above, document 118 has the path: /Windows/Word/Example.doc. To access this file, the makes an initial scan of directory links table 310 to find the entry where root directory 110 is the parent file and Windows directory 114 is the child file. To do this, the DBMS executes something like the following SQL statement:

Select ChildID
      from directory$_{13}$ links
   Where ParentID="X1"
      child$_{13}$ name="Window".

This query returns the ID of the child file, which in this case is X2 (for Windows directory 114). After obtaining the ID of the child file, the DBMS makes a second scan of the directory links table 310, this time looking for the entry where the parent file is Windows directory 114, and the child file is Word directory 116. This is achieved by executing the following Select statement:

Select ChildID
      from directory$_{13}$ links
   Where ParentID="X2" and
      Child$_{13}$ name="Word".

This query returns the ID of Word directory 116, which in this example is X3. With this information, the DBMS makes a third scan of directory links table 310, this time searching for the entry where the parent file is Word directory 116 and the child file is Example.doc document 118. This is achieved with the following Select statement:

Select ChildID
      from directory$_{13}$ links
   Where ParentID="X3" and
      Child$_{13}$ name="Example.doc"

At the end of this process, the ID of document 118 will have been determined. Using this ID as the primary key, the proper entry in files table 210 is located, and the contents of 118 are accessed from the body field. Thus, using this technique, files that are actually stored in a relational structure, such as table 210, may be located and accessed using pathnames just as if they were stored in a hierarchically organized structure. The user submitting the pathname to locate a file need not understand the complexity of a relational system. Conversely, because the files are stored in a relational system, the files may be efficiently accessed in more sophisticated ways by users that is familiar with relational systems.

At the end of this process, the ID of document 118 will have been determined. Using this ID as the primary key, the proper entry in files table 210 is located, and the contents of document 118 are accessed from the body field. Thus, using this technique, files that are actually stored in a relational structure, such as table 210, may be located and accessed using pathnames just as if they were stored in a hierarchically organized structure. The user submitting the pathname to locate a file need not understand the complexity of a relational system. Conversely, because the files are stored in a relational system, the files may be efficiently accessed in more sophisticated ways by users that are familiar with relational systems.

For purposes of simplifying the performance evaluation, assume that the performance of the pathname resolution is directly proportional to the number of disk blocks that must be accessed. (This is because disk access is an order of 100 slower than memory access, and for large file systems, we can assume that most of the data will be on disk.) Assuming that a conventional BTREE index has been built on the directory$_{13}$ links table 310, the number of disk block accesses that a DBMS has to perform in one scan of a table is log(n)/m where n is the number of entries in the table and m is the number of entries per block. Thus, using the pathname resolution technique described above, the average number of accesses that the DBMS will have to perform to access a file is i*log(n)/m.

For complex file systems having a large number of links and a large number of link levels, the number of disk accesses can become quite large. Since I/O operations are very slow relative to other types of operations, having a large number of disk accesses can significantly degrade system performance. In general, the pathname resolution method described is quite slow when applied to large, complex file systems.

While the data structure of the table is appropriate for easy access to the file system data from relational applications, the standard types of indexes used by databases are too slow for efficient pathname-based access to data organized in this manner. What is needed, then, is an apparatus, system or method that emulates a hierarchically organized system using a relationally organized system, but which reduces the number of disk accesses necessary to locate the items in the system when they are accessed based on their pathnames.

SUMMARY OF THE INVENTION

A method and mechanism are provided for creating, maintaining, and using a hierarchical index to efficiently access information in a relational system based on a pathnames, thus emulating a hierarchically organized system.

According to one aspect of the invention, each item that has any children in the emulated hierarchical system has an index entry in the index. The index entries in the index are linked together in a way that reflects the hierarchical relationship between the items associated with the index entries. Specifically, if a parent-child relationship exists between the items associated with two index entries, then the index entry associated with the parent item has a direct link to the index entry associated with the child item.

According to another aspect of the invention, pathname resolution is performed by following direct links between the index entries associated with the items in a pathname, according to the sequence of the filenames within the pathname. By using an index whose index entries are linked in this manner, the process of accessing the items based on their pathnames is significantly accelerated, and the number of disk accesses performed during that process is significantly reduced.

DESCRIPTION OF THE DRAWINGS

The present invention is illustrated by way of example, and not by way of limitation, in the figures of the accompanying drawings and in which like reference numerals refer to similar elements and in which:

FIG. 2 shows a files table 210 that may be used to emulate a hierarchically organized system in a relationally organized system;

FIG. 3 shows a directory links table 310 that may be used in conjunction with files table 210 of FIG. 2 to emulate a hierarchically organized system;

FIG. 5 shows a hierarchical index that may be used to enhance performance of an emulated hierarchical system within a relational system;

DESCRIPTION OF THE PREFERRED EMBODIMENT

A method and apparatus for providing efficient pathname-based access to data stored in a relational system is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

FUNCTIONAL OVERVIEW

Techniques are described herein for creating, maintaining, and using a hierarchical index to efficiently access information in a relational system based on a pathnames, thus emulating a hierarchically organized system. Each item that has any children in the emulated hierarchical system has an index entry in the index. The index entries in the index are linked together in a way that reflects the hierarchical relationship between the items associated with the index entries. Specifically, if a parent-child relationship exists between the items associated with two index entries, then the index entry associated with the parent item has a direct link to the index entry associated with the child item.

Consequently, pathname resolution is performed by following direct links between the index entries associated with the items in a pathname, according to the sequence of the filenames within the pathname. By using an index whose index entries are linked in this manner, the process of accessing the items based on their pathnames is significantly accelerated, and the number of disk accesses performed during that process is significantly reduced.

DATABASE ARCHITECTURE

Figure 1:
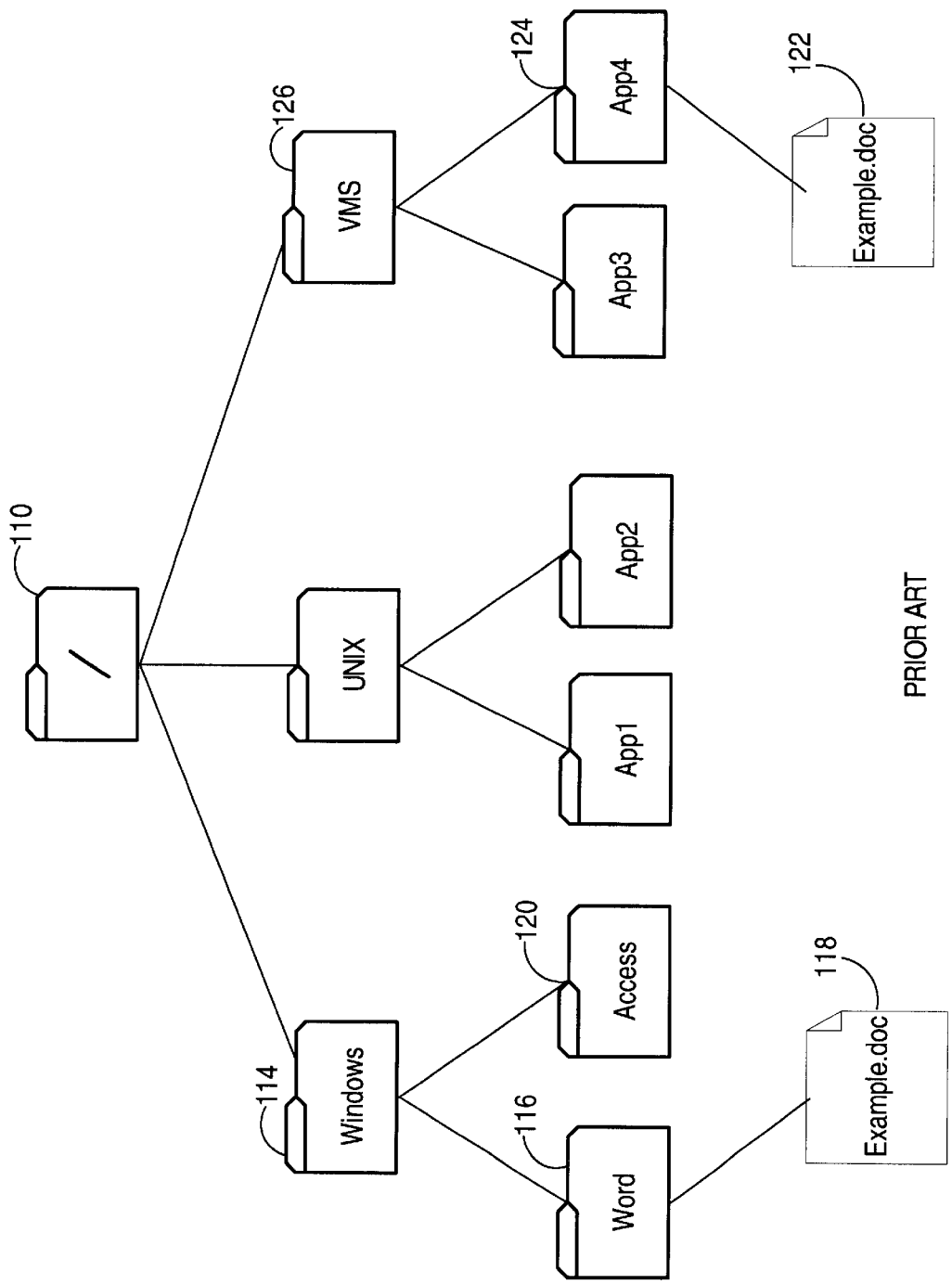
FIG. 1 is a block diagram illustrating a hierarchically organized file system.
Figure 4:
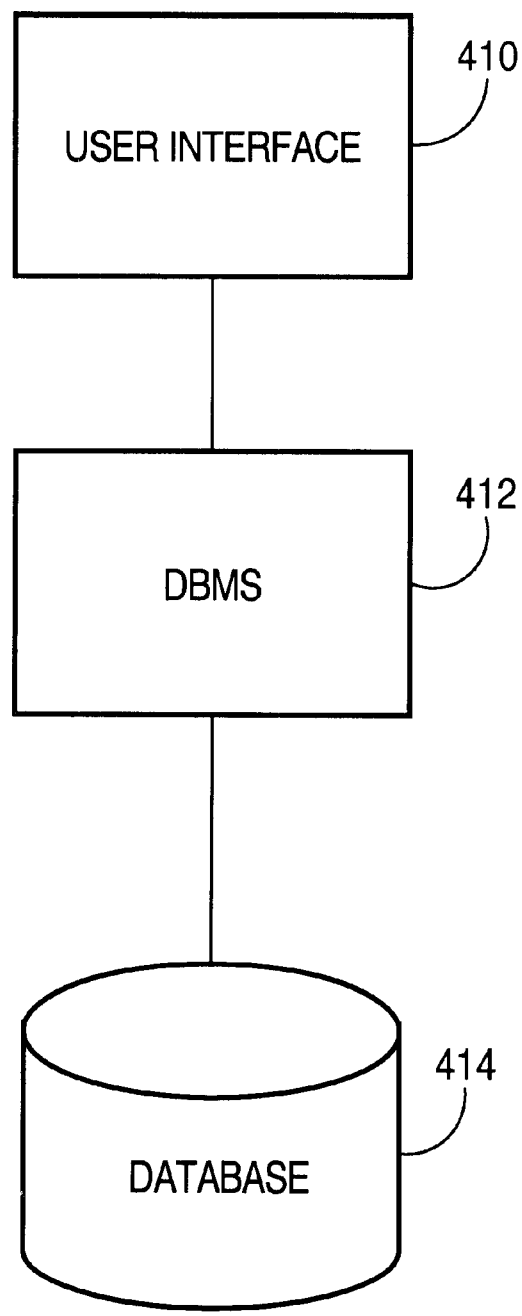
FIG. 4 is a block diagram illustrating a database system that may be used to implement a hierarchical index in accordance with one embodiment of the invention.

FIG. 4 is a block diagram showing a database architecture that may be used to create, use, and maintain a hierarchical index consistent with the principles of the present invention. The architecture comprises a user interface 410, a DBMS 412, and a database 414. DBMS 412 interacts with the user via user interface 410, and accesses and maintains database 414 in accordance with the user input. DBMS 412 may also interact with other systems (not shown).

DBMS 412 creates, uses, and maintains a hierarchical index in database 414 in accordance with the principles of the present invention. Hierarchical index creation, use and maintenance will be described hereafter in greater detail.

In general, DBMS 412 creates a database by organizing information in one or more tables. The organization of the table is referred to as a definition. An index is a structure that is used for accessing particular information in the table more quickly. Therefore, a table definition supports any access mechanism to the data (search by name, by ID, by date, etc.), whereas an index is designed for a specific access method. The index itself is generally not the authoritative source of the data, but rather contains pointers to the disk addresses of the tables storing the authoritative data.

HIERARCHICAL INDEX

Hierarchical indexes consistent with the invention support the pathname-based access method of a hierarchical system, moving from parent items to their children, as specified by the pathname. According to one embodiment, a hierarchical index consistent with the principles of the invention employs index entries that include the following three fields: RowID, File ID, and $Dir_{13}$ $entry_{13}$ list (stored as an array).

FIG. 5 shows a hierarchical index 510 consistent with the invention, which may be used to emulate a hierarchical storage system in a database. Hierarchical index 510 is a table. RowID column contains system generated Ids, specifying a disk address that enables DBMS 412 to locate the row on the disk. Depending on the relational database system, RowID may be an implicitly defined field that the DBMS uses for locating data stored on the disk drive. The FileID field of an index entry stores the FileID of the file that is associated with the index entry.

According to one embodiment of the invention, hierarchical index 510 only stores index entries for items that have children. In the context of an emulated hierarchical file system, therefore, the items that have index entries in the hierarchical index 510 are only those directories that are parents to other directories and/or that are currently storing documents. Those items that do not have children (Example.doc, Access, App1, App2, App3) are preferably not included. The Dir $entry_{13}$ list field of the index entry for a given file stores, in an array, an "array entry" for each of the child files of the given file.

For example, index entry 512 is for the Windows directory 114. The Word directory 116 and the Access directory 120 are children of the Windows directory 114. Hence, the Dir $entry_{13}$ list field of index entry 512 for the Windows directory 114 includes an array entry for the Word directory 116 and an array entry for the Access directory 120.

According to one embodiment, the specific information that the $Dir_{13}$ $entry_{13}$ list field stores for each child includes the filename of the child and the FileID of the child. For children that have their own entries in the hierarchical index 510, the $Dir_{13}$ $entry_{13}$ list field also stores the RowID of the child's index entry. For example, the Word directory 116 has its own entry in hierarchical index 510 (entry 514). Hence, the $Dir_{13}$ $entry_{13}$ list field of index entry 512 includes the name of directory 116 ("Word"), the RowID of the index entry for directory 116 in hierarchical index 510 ("Y3"), and the FileID of directory 116 ("X3"). As shall be described in greater detail, the information contained in the $Dir_{13}$ $entry_{13}$ list field makes accessing information based on pathnames much faster and easier.

Several key principles of the hierarchical index are as follows:

$Dir_{13}$ $entry_{13}$ list information in the index entry for a given directory is kept together in as few disk blocks as possible, since the most frequently used file system operations (pathname resolution, directory listing) will need to look at many of the entries in a particular directory whenever that directory is referenced. In other words, directory entries should have a high locality of reference because when a particular directory entry is referenced, it is likely that other entries in the same directory will also be referenced.

The information stored in the index entries of the hierarchical index must be kept to a minimum, so as to fit the maximum number of entries in a particular disk block. Grouping directory entries together in an array means that there is no need to replicate a key identifying the directory they are in; all of the entries in a directory share the same key. This is in contrast to the typical relational table model shown in the $directory_{13}$ links table (table 310).

The time needed to resolve a pathname should be proportional to the number of directories in the path, not the total number of files in the filesystem. This allows the user to keep frequently-accessed files toward the top of the filesystem tree, where access time is lower.

These elements are all present in typical file system directory structures, such as the UNIX system of inodes and directories. The use of a hierarchical index, as described herein, reconciles those goals with the structures that a relational database understands and can query, to allow the database server to do ad-hoc searches of files in a manner other than that used in pathname resolution. To do this, the database concept of an index must be used: a duplicate of parts of the underlying information (in this case, the file data) arranged in a data structure in a different manner designed to optimize access via a particular method (in this case, resolution of a pathname in a hierarchical tree).

USING THE HIERARCHICAL INDEX

Figure 7:
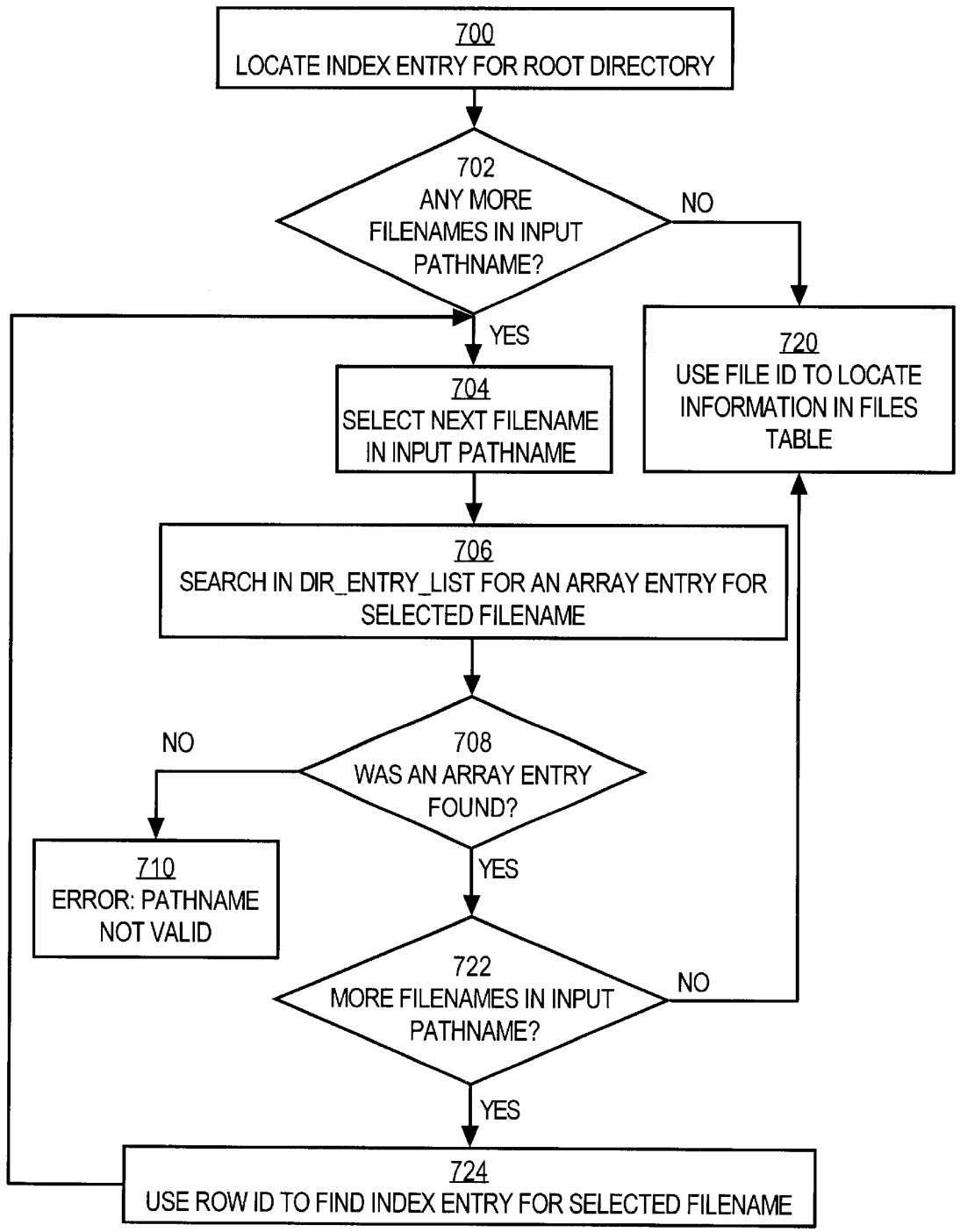
FIG. 7 is a flowchart showing the process for resolving a pathname using hierarchical index 510 in accordance with an embodiment of the invention.

How hierarchical index 510 may be used to access a file based on the pathname of the file shall now be described with reference to the flowchart in FIG. 7. It shall be assumed for the purpose of explanation that document 118 is to be accessed through its pathname. The pathname for this file is /Windows/Word/Example.doc, which shall be referred to hereafter as the "input pathname". Given this pathname, the pathname resolution process starts by locating within hierarchical index 510 the index entry for the first name in the input pathname. In the case of a file system, the first name in a pathname is the root directory. Therefore, the pathname resolution process for locating a file within an emulated file system begins by locating the index entry 508 of the root directory 110 (step 700). Because all pathname resolution operations begin by accessing the root directory's index entry 508, data that indicates the location of the index entry for the root directory 110 (index entry 508) may be maintained at a convenient location outside of the hierarchical index 510 in order to quickly locate the index entry 508 of the root directory at the start of every search.

Once the index entry 508 for the root directory 110 has been located, the DBMS determines whether there are any more filenames in the input pathname (step 702). If there are no more filenames in the input pathname, then control proceeds to step 720 and the FileID stored in index entry 508 is used to look up the root directory entry in the files table 210.

In the present example, the filename "Windows" follows the root directory symbol "/" in the input pathname. Therefore, control proceeds to step 704. At step 704, the next filename (e.g. "Windows") is selected from the input pathname. At step 706, the DBMS in the $Dir_{13}$ $entry_{13}$ list column of the index entry 508 to locate an array entry pertaining to the selected filename.

In the present example, the filename that follows the root directory in the input pathname is "Windows". Therefore, step 706 involves searching the $Dir_{13}$ $entry_{13}$ list of index entry 508 for an array entry for the filename "Windows". If the $Dir_{13}$ $entry_{13}$ list does not contain an array entry for the selected filename, then control would proceed from step 708 to step 710, where an error is generated to indicate that the input pathname is not valid. In the present example, the $Dir_{13}$ $entry_{13}$ list of index entry 508 does include an array entry for "Windows". Therefore, control passes from step 708 to step 722.

The information in the $Dir_{13}$ $entry_{13}$ list of index entry 508 indicates that one of the children of the root directory 110 is indeed a file named "Windows". Further, the $Dir_{13}$ $entry_{13}$ list array entry contains the following information about this child: it has an index entry located at RowID Y2, and its FileID is X2.

At step 722, it is determined whether there are any more filenames in the input pathname. If there are no more filenames, then control passes from step 722 to step 720. In the present example, "Windows" is not the last filename, so control passes instead to step 724.

Because "Windows" is not the last filename in the input path, the FileID information contained in the $Dir_{13}$ $entry_{13}$ list is not used during this path resolution operation. Rather, because Windows directory 114 is just part of the specified path and not the target, files table 210 is not consulted at this point. Instead, at step 724 the RowID (Y2) for "Windows", which is found in the $Dir_{13}$ $entry_{13}$ list of index entry 508, is used to locate the index entry for the Windows directory 114 (index entry 512).

Consulting the $Dir_{13}$ $entry_{13}$ list of index entry 512, the system searches for the next filename in the input pathname (steps 704 and 706). In the present example, the filename "Word" follows the filename "Windows" in the input pathname. Therefore, the system the $Dir_{13}$ $entry_{13}$ list of index entry 512 for an array entry for "Word". Such an entry exists in the $Dir_{13}$ $entry_{13}$ list of index entry 512, indicating that "Windows" actually does have a child named "Word" (step 708). At step 722, it is determined that there are more filenames in the input path, so control proceeds to step 724. Upon finding the array entry for "Word", the system reads the information in the array entry to determine that an index entry for the Word directory 116 can be found in hierarchical index 510 at RowID Y3, and that specific information pertaining to Word directory 116 can be found in files table 210 at row X3. Since Word directory 116 is just part of the specified path and not the target, files table 210 is not consulted. Instead, the system uses the RowID (Y3) to locate the index entry 514 for Word directory 116 (step 724).

At RowID Y3 of hierarchical index 510, the system finds index entry 514. At step 704, the next filename "Example.doc" is selected from the input pathname. At step 706, the $Dir_{13}$ $entry_{13}$ list of index entry 514 is searched to find (step 708) that there is an array entry for "Example.doc", indicating that "Example.doc" is a child of Word directory 116. The system also finds that Example.doc has no indexing information in hierarchical index 510, and that specific information pertaining to Example.doc can be found in files table 210 using the FileID X4. Since Example.doc is the target file to be accessed (i.e. the last filename in the input path), control passes to step 720 where the system uses the FileID X4 to access the appropriate row in the files table 210, and to extract the file body (the BLOB) stored in the body column of that row. Thus, the Example.doc file is accessed.

In accessing this file, only hierarchical index 510 was used. No table scans were necessary. With typical sizes of blocks and typical filename lengths, at least 100 directory entries will fit in a disk block, and a typical directory has less than 100 entries. This means that the list of directory entries in a given directory will typically fit in a single block. In other words, any single index entry of hierarchical index 510, including the entire $Dir_{13}$ $entry_{13}$ list array of the index entry, will typically fit entirely in a single block, and therefore can be read in a single I/O operation.

In moving from index entry to index entry in the hierarchical index 510, it is possible that some disk accesses will need to be performed if the various index entries in the index reside in different disk blocks. If each index entry entirely fits in a single block, then the number of disk accesses, however, will at most be i. In other words, one disk access is used for each directory in the path. Even if the size of an average index entry does not fit in a single disk block, but requires 2 or 3 blocks, this will be a constant term, and will not increase with the total number of files in the file system. Unlike the prior methodology, the number of disk I/Os will not be $i*\log(n)/m$. Thus, file access using the present invention will be much faster.

CREATION OF HIERARCHICAL INDEX

As explained above, a filename is the name used to reference any file stored in a directory, and is a component of the pathname. For example, in the pathname "/Windows/Word/Example.doc", "Windows" is the filename of a directory, "Word" is the filename of a directory within "Windows", and "Example.doc" is the filename of a document stored in the "Word" directory. Note that a separator character divides the filenames within a pathname. The separator character may differ in individual file system implementations. Microsoft file systems, for example, have generally used a backslash ("\") character, UNIX file systems use a forward slash, and Apple Macintosh file systems use a colon (":") to separate filenames.

According to one embodiment, the FileID is the primary key in the files table 210, where the actual file data is stored. However, any primary key that references the data stored for each file could be used in the hierarchical index in place of the FileID. The FileID in this case is what is usually referred to as a "foreign key" in the hierarchical index 510.

Initially there are no files in the file system other than the root directory (/). Therefore, the hierarchical index is created by inserting one row into the index 510 (FIG. 5) for the root directory. Because there are no files in the root directory at this point, the $Dir_{13}$ $entry_{13}$ list field of the root directory's index entry should be left empty. The user of the hierarchical index should keep the RowID of the root entry in a separate location (for example, in dynamic memory or in a separate table in the database with only one entry). The root entry is the staring point for every use of the hierarchical index 510, so it is important to have the location of that entry readily available. As new files are added to the file system, the hierarchical index 510 is updated as described in the section below entitled "Maintenance of Hierarchical Index."

If the hierarchical index 510 is to be created after the file system has been populated, it may be created by traversing the entire file system and adding hierarchical index entries for each file present in the file system in the same manner as if the file had just been added to the system, according to the method described in "Maintenance of Hierarchical Index."

MAINTENANCE OF HIERARCHICAL INDEX

Figure 6A:
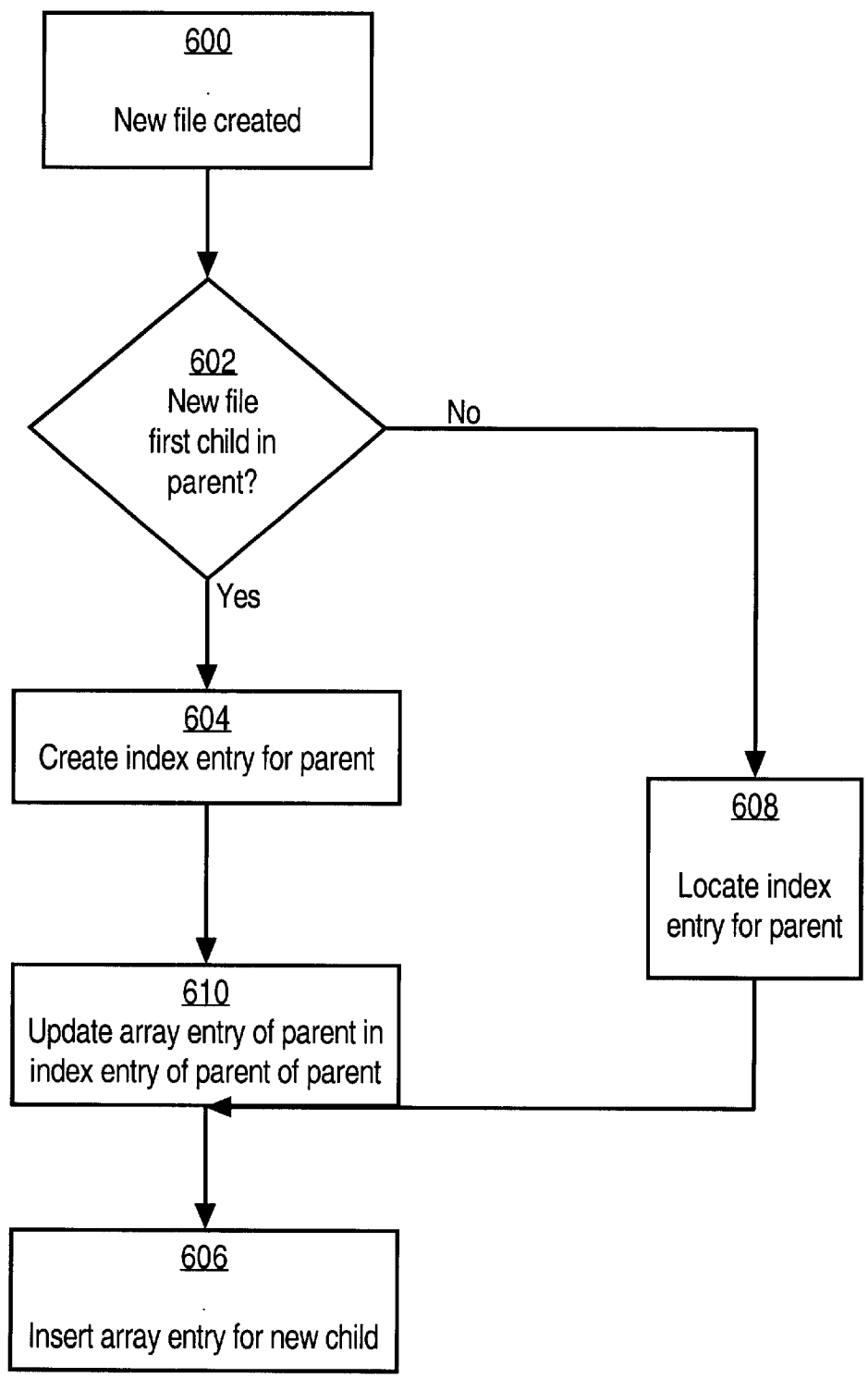
FIG. 6A is a flowchart illustrating how hierarchical index 510 is maintained during the creation of an item.

The maintenance of one embodiment of a hierarchical index shall now be described with reference to FIGS. 6A and 6B. Referring to FIG. 6A, it is a flowchart illustrating steps performed in response to a file being created in a file system that is being emulated in a relational system that uses a hierarchical index. At step 600, the new file is created. At step 602, it is determined whether the new file is the first child of the file that has been designated as its parent. For example, assume that a document Doc1.doc is being created in the App1 directory. Currently, App1 does not have any children, so Doc1.doc would be its first child and control would pass to step 604.

At step 604, an index entry is created for the parent. In the present example, an index entry would be created for "App1". At step 610, the array entry for the parent, which resides the index entry for the parent's parent, is updated to include a link to the newly created index entry. In the present example, the array entry 518 for "App1" that resides in the index entry 516 for "Unix" is updated to include the RowID, within hierarchical index 510, of the newly created index entry for "App1". At step 606, an array entry for the new file Doc1.doc is inserted into the $Dir_{13}$ $entry_{13}$ list of the newly created index entry for "App1".

If the file being created is not the first child of the designated parent, then control passes to step 608. At step 608, the index entry for the designated parent is located, and at step 606 an array entry for the new file is inserted into the $Dir_{13}$ $entry_{13}$ list of the parent's index entry.

Figure 6B:
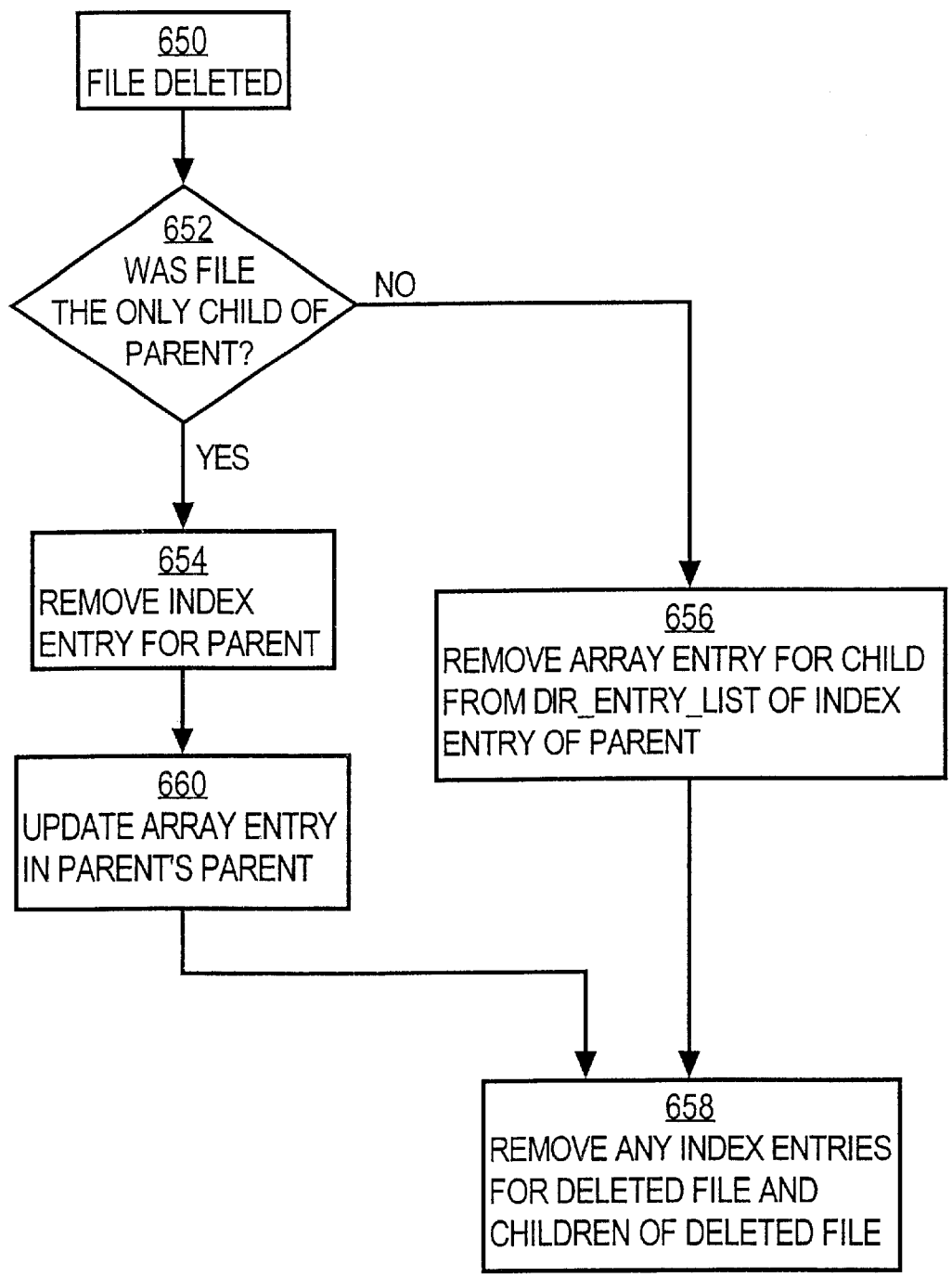
FIG. 6B is a flowchart illustrating how hierarchical index 510 is maintained during the deletion of an item.

FIG. 6B is a flowchart illustrating the steps for updating a hierarchical index in response to a file being deleted. At step 650, the file is deleted. At step 652, it is determined whether the file was the only child of a parent. If the deleted file was the only child of a parent, then the index entry for the parent is removed from the index (step 654) and the array entry for the parent that resides in the index entry of the parent's parent is updated (step 660) to reflect that the parent no longer has an index entry in the index. If the child was not the only index entry for the parent, then the array entry for the deleted file is removed from the Dir entry list of the parent.

Whether or not the deleted file was the only child of its parent, any index entry for the deleted file and index entries for the deleted file's descendants are also deleted (Step 658).

When files are moved from one location in the hierarchy to another, the hierarchical index is updated by removing the array entry for the file from the $Dir_{13}$ $entry_{13}$ list of its old parent, and adding an array entry for the item to the $Dir_{13}$ $entry_{13}$ list of its new parent.

SEARCHING THE $DIR_{13}$ $ENTRY_{13}$ LIST ARRAY

As explained above, one step of the pathname resolution process involves searching through the $Dir_{13}$ $entry_{13}$ list array for an array entry of a particular child (FIG. 7, step 706). to one embodiment, this search process is facilitated by storing the array entries in each $Dir_{13}$ $entry_{13}$ list array in alphabetical order. By storing the array entries in order, more efficient searching techniques, such as a binary search, may be used to find the entry for a given child. However, maintaining the array entries in sorted order incurs additional maintenance overhead. Consequently, in one embodiment, only arrays that have more than a threshold number of array entries are ordered.

VARIATIONS

Specific embodiments have been used to illustrate the use of a hierarchical index to access hierarchical data in a relational system. However, the present invention is not limited to the embodiments described. For example, hierarchical index 510 only includes index entries for those items that have at least one child. However, a hierarchical index may optionally include index entries for all items, whether or not they have children.

As illustrated, the $Dir_{13}$ $entry_{13}$ list array entries of an index entry in hierarchical index 510 include the FileID, which may be used to locate the child in the files table. However, the actual fields stored in each $Dir_{13}$ $entry_{13}$ list array entry may vary from implementation to implementation. For example, the $Dir_{13}$ $entry_{13}$ list may additionally or alternatively include the RowID of the corresponding row in the files table, or any other unique, non-null key that can be used to locate the corresponding entry in the files table.

According to one embodiment, the FileID is generated sequentially, in contrast to rowids that are typically based on disk block addresses. The FileID values are useful in importing/exporting the directories in and out of the database (e.g. for backup/restore purposes), since the RowIDs used by the exporting database may be different than the RowIDs used for the same rows by the importing database if the importing database finds a different place on disk to load the directory.

According to one embodiment, the hierarchical index does not have a separate FileID column, as shown in FIG. 5. Instead, the FileID of the target item is extracted from the array entry for the target item, which is located in the $Dir_{13}$ $entry_{13}$ list of the parent of the target item. The FileID of the root directory, which has no parent, may be stored separate from the hierarchical index.

In addition, the $Dir_{13}$ $entry_{13}$ list entries may be used to "cache" useful information about the items to which they correspond. Such additional information may include, for example, information about the security privileges associated with the item. In some cases, the additional information stored in the array entry for an item may include all of the information required to satisfy a query that references the item, thus completely avoiding the need to access the item's files table information. However, the desire to cache useful information in the $Dir_{13}$ $entry_{13}$ list must be weighed against the need to limit the size of the $Dir_{13}$ $entry_{13}$ list to reduce the number of I/Os required to read each index entry.

Embodiments of the invention have been described in the context of a file system. However, the techniques described herein are applicable to the storage, within a relationally organized system, of any hierarchically organized information. For example, a relational system may be used to store records about animals, where the animal records are to be accessed based on a hierarchical "path" consisting of the class, order, family and species to which the animals belong.

HARDWARE OVERVIEW

Figure 8:
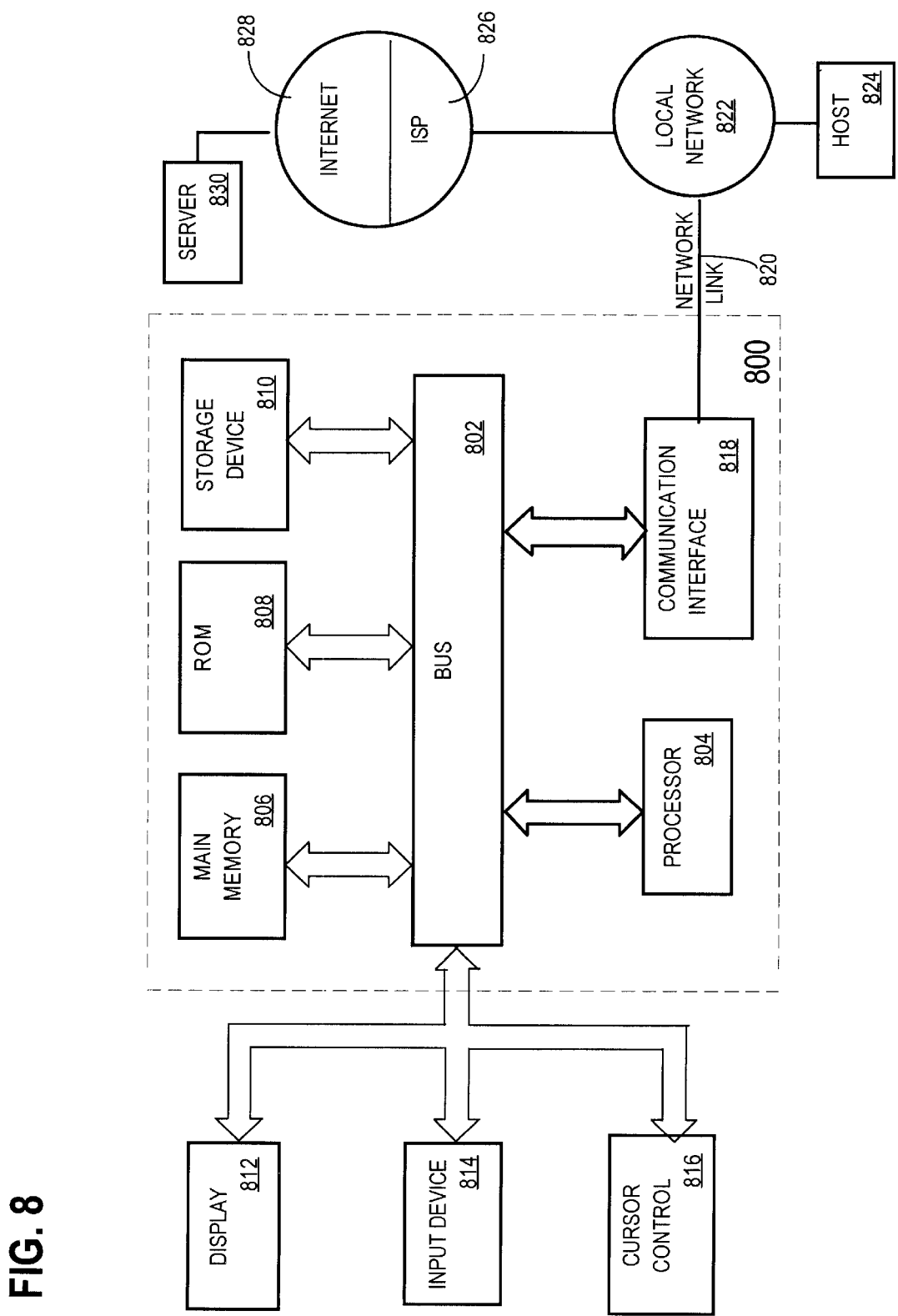
FIG. 8 is a block diagram illustrating an example of a hardware system that may be used to implement the apparatus, systems and methods consistent with the invention.

FIG. 8 is a block diagram that illustrates a computer system 800 upon which an embodiment of the invention may be implemented. Computer system 800 includes a bus 802 or other communication mechanism for communicating information, and a processor 804 coupled with bus 802 for processing information. Computer system 800 also includes a main memory 806, such as a random access memory (RAM) or other dynamic storage device, to bus 802 for storing information and instructions to be executed by processor 804. Main memory 806 also may be used for storing temporary variables or other intermediate information during execution of instructions to be executed by processor 804. Computer system 800 further includes a read only memory (ROM) 808 or other static storage device coupled to bus 802 for storing static information and instructions for processor 804. A storage device 810, such as a magnetic disk or optical disk, is provided and coupled to bus 802 for storing information and instructions.

Computer system 800 may be coupled via bus 802 to a display 812, such as a cathode ray tube (CRT), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

The invention is related to the use of computer system 800 for accessing hierarchically organized information stored in a relational system. According to one embodiment of the invention, computer system 800 creates, maintains and uses a hierarchical index in response to processor 804 executing one or more sequences of one or more instructions contained in main memory 806. Such instructions may be read into main memory 806 from another computer-readable medium, such as storage device 810. Execution of the sequences of instructions contained in main memory 806 causes processor 804 to perform the process steps described herein. In alternative embodiments, hard-wired circuitry may be used in place of or in combination with software instructions to implement invention. Thus, embodiments of the invention are not limited to any specific combination of hardware circuitry and software.

The term "computer-readable medium" as used herein refers to any medium that participates in providing instructions to processor 804 for execution. Such a medium may take many forms, including but not limited to, non-volatile media, volatile media, and transmission media. Non-volatile media includes, for example, optical or magnetic disks, such as storage device 810. Volatile media includes dynamic memory, such as main memory 806. Transmission media includes coaxial cables, copper wire and fiber optics, including the wires that comprise bus 802. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 804 for execution. For example, the instructions may initially be carried on a magnetic disk of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are exemplary forms of carrier waves transporting the information.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818.

The received code may be executed by processor 804 as it is received, and/or stored in storage device 810, or other non-volatile storage for later execution. In this manner, computer system 800 may obtain application code in the form of a carrier wave.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for indexing, in a relational system, a plurality of items that belong to a hierarchy, the method comprising the steps of:
   creating an index;
   storing in the index a first index entry for a first item of the plurality of items, said first item being a child of a second item in said hierarchy; and
   storing in the index a second index entry for the second item of the plurality of items, said second index entry containing a link to said first index entry for locating said first index entry in said index.

2. The method of claim 1 wherein said second item has a plurality of children in the hierarchy, the method further including the step of storing within said second index entry an array of array entries, said array of array entries including an array entry for each child item of said second item.

3. The method of claim 2 further comprising the step of storing, in each array entry of said array that corresponds to a child item that has its own index entry in said index, a link to the index entry for the child item.

4. The method of claim 2 further comprising the steps of:
   receiving a sequence of names, including a first name associated with the first item and a second name associated with the second item;
   using said second name to locate said second index entry;

using said first name to locate, within said array in said second index entry, an array entry for said first item;

reading said link to said first index entry from said array entry for said first item; and following said link to said first index entry.

5. The method of claim 1 wherein the plurality of items includes a third item that is a child of said second item, the method including the steps of:

storing in said index a third index entry for said third item; and storing in said second index entry a link to said third item.

6. The method of claim 1 wherein:

the first index entry includes information for locating said first item; and the second index entry includes information for locating said second item.

7. The method of claim 1 wherein:

the first item is stored outside said index; and the second index entry includes information for locating said first item outside of said index.

8. The method of claim 2 further comprising the step of maintaining said array of array entries in sorted order based on the child items with which they are associated.

9. A computer readable medium having stored thereon:

an index for accessing a plurality of items that are related to each other according to a hierarchy, where each item of said plurality of items has zero or more child items;

said index including a plurality of index entries;

wherein each index entry of said plurality of index entries corresponds to an item of said plurality of items, and is linked to all index entries within the index that correspond to child items of said item.

10. The computer readable medium of claim 9 wherein:

the plurality of items are stored electronically outside said index; and each index entry of said plurality of index entries stores data for locating, outside said index, the item that corresponds to the index entry.

11. The computer readable medium of claim 10 wherein:

the plurality of items are stored in rows of a table; and each index entry of said plurality of index entries stores data for locating in said table the row for the item that corresponds to the index entry.

12. The computer readable medium of claim 9 wherein:

the plurality of items are stored electronically outside said index; and each index entry of said plurality of index entries stores data for locating, outside said index, the child items of the item that corresponds to the index entry.

13. The computer readable medium of claim 12 wherein:

the plurality of items are stored in rows of a table; and each index entry of said plurality of index entries stores data for locating in said table the rows for the child items of the item that corresponds to the index entry.

14. The computer readable medium of claim 9 wherein each index entry that corresponds to an item that has child items includes an array of array entries, where each array entry in the array stores information about a child item of the item.

15. The computer readable medium of claim 14 wherein the array entry for each child item stores a name for the child item.

16. The computer readable medium of claim 15 wherein the array entries within the array are maintained in sorted order based on the names of the child items.

17. The computer readable medium of claim 14 wherein the array entry for each child item stores:

data for locating the child item outside the index, and for each child item that has its own index entry, a link to the index entry of the child item.

18. A method for locating items that belong to a hierarchy that establishes parent-child relationships between the items, the method comprising the steps of:

receiving a sequence of identifiers that identifies a path through the hierarchy to a target item;

using a hierarchical index to locate information about said target item by performing the steps of:

locating, within said hierarchical index, an index entry for a first item, wherein said first item is the item identified by the first identifier in said sequence of identifiers;

beginning with said index entry for said first item, following links between index entries, in a sequence dictated by said sequence of identifiers, to arrive at a particular index entry that indicates where said information about the target item is located; and using information in said particular index entry to locate and access said information about said target item.

19. The method of claim 18 wherein the step of following links includes:

within an index entry for a parent item, searching an array to locate an array entry for a particular child item, wherein the array includes array entries for each child item of the parent item.

20. The method of claim 19 wherein:

the parent item corresponds to an identifier in said sequence of identifiers;

the particular child item corresponds to an identifier in said sequence of identifiers; and the identifier for said parent item immediately precedes the identifier for said particular child item in said sequence of identifiers.

21. A computer readable medium having stored thereon sequences of instructions for locating items that belong to a hierarchy that establishes parent-child relationships between the items, the sequences of instructions including instructions for performing the steps of:

receiving a sequence of identifiers that identifies a path through the hierarchy to a target item;

using a hierarchical index to locate information about said target item by performing the steps of:

locating, within said hierarchical index, an index entry for a first item, wherein said first item is the item identified by the first identifier in said sequence of identifiers;

beginning with said index entry for said first item, following links between index entries, in a sequence dictated by said sequence of identifiers, to arrive at a particular index entry that indicates where said information the target item is located; and using information in said particular index entry to locate and access said information about said target item.

22. The computer readable medium of claim 21 wherein the step of following links includes:

within an index entry for a parent item, searching an array to locate an array entry for a particular child item, wherein the array includes array entries for each child item of the parent item.

23. The computer readable medium of claim 22 wherein:

the parent item corresponds to an identifier in said sequence of identifiers;

the particular child item corresponds to an identifier in said sequence of identifiers; and the identifier for said parent item immediately precedes the identifier for said particular child item in said sequence of identifiers.

24. A computer-readable medium carrying one or more sequences of instructions for indexing, in a relational system, a plurality of items that belong to a hierarchy, wherein execution of the one or more sequences of instructions by one or more processors causes the one or more processors to perform the steps of:

creating an index;

storing in the index a first index entry for a first item of the plurality of items, said first item being a child of a second item in said hierarchy; and storing in the index a second index entry for the second item of the plurality of items, said second index entry containing a link to said first index entry for locating said first entry in said index.

25. The computer-readable medium of claim 24 wherein said second item has a plurality of children in the hierarchy, and wherein execution of the one or more sequences of instructions by one or more processors causes the one or more processors to perform the step of:

storing within said second index entry an array entries, said array of array entries including an array entry for each child item of said second item.

26. The computer-readable medium of claim 25 wherein execution of the one or more sequences of instructions by one or more processors causes the one or more processors to perform the step of:

storing, in each array entry of said array that corresponds to a child item that has its own index entry in said index, a link to the index entry for the child item.

27. The computer-readable medium of claim 25 wherein execution of the one or more sequences of instructions by one or more processors causes the one or more processors to perform the steps of:

receiving a sequence of names, including a first name associated with the first item;

using said second name to locate said second index entry;

using said first name to locate, within said array in said second index entry, an array entry for said first item;

reading said link to said first index entry from said array entry for said first item; and following said link to said first index entry.

28. The computer-readable medium of claim 25 wherein execution of the one or more sequences of instructions by one or more processors causes the one or more processors to perform the step of:

maintaining said array of array entries in sorted order based on the child items with which they are associated.

29. The computer-readable medium of claim 24 wherein the plurality of items includes a third item that is a child of said second item, and wherein execution of the one or more sequences of instructions by one or more processors causes the one or more processors causes the one or more processors to perform the steps of:

storing in said index a third index entry for said third item; and storing in said second index entry a link to said third item.

30. The computer-readable medium of claim 24 wherein:

the first index entry includes information for locating said first item; and the second index entry includes information for locating said second item.

31. The computer-readable medium of claim 24 wherein:

the first item is stored outside said index; and the second index entry includes information for locating said first item outside of said index.

32. A computer apparatus comprising:

a memory; and one or more processors coupled to the memory and configured to execute one or more sequence of instructions for indexing, in a relational system, a plurality of items that belong to a hierarchy, wherein execution of the one or more processors to perform the steps of:

creating an index;

storing in the index a first index entry for a first item of the plurality of items, said first item being a child of a second item in said hierarchy; and storing in the index a second index entry for the second item of the plurality of items, said second index entry containing a link to said first index entry for locating said first index entry in said index.

33. A computer apparatus comprising:

a memory having stored thereon:

an index for accessing a plurality of items that are related to each other according to a hierarchy, where each item of said plurality of items has zero or more child items;

said index including a plurality of index entries;

wherein each index entry of said plurality of index entries corresponds to an item of said plurality of items, and is linked to all index entries within the index that correspond to child items of said item.

34. A computer apparatus comprising:

a memory; and one or more processors coupled to the memory and configured to execute one or more sequence of instructions for locating items that belong to a hierarchy that establishes parent-child relationships between the items, wherein execution of the one or more processors to perform the steps of:

receiving a sequence of identifiers that indentifies a path through the hierarchy to a target item;

using a hierarchical index to locate information about said target item by performing the steps of:

locating, within said hierarchical index, an index entry for a first item, wherein said first item is the item identified by the first identifier in said sequence of identifiers;

beginning with said index entry for said first item, following links between index entries, in a sequence dictated by said sequence of identifiers, to arrive at a particular index entry that indicates where said information about the target item is located; and using information in said particular index entry to locate and access said information about said target item.

\* \* \* \* \*